United States Patent [19]

Boughton

[11] Patent Number: 5,007,791

[45] Date of Patent: Apr. 16, 1991

[54] ISO CONTAINER HANDLING SYSTEM

[75] Inventor: T. Trafford Boughton, Amersham, England

[73] Assignee: T. T. Boughton & Sons Ltd., Great Britain

[21] Appl. No.: 269,859

[22] Filed: Nov. 10, 1988

[30] Foreign Application Priority Data

Nov. 13, 1987 [GB] United Kingdom ............... 8726608

[51] Int. Cl.$^5$ ............................................. B60P 1/00
[52] U.S. Cl. .................................. 414/494; 294/81.53; 414/500; 414/534
[58] Field of Search ............... 414/471, 477, 482, 491, 414/494, 498, 499, 500, 546, 555, 532, 533, 534, 529, 633, 634, 635; 294/81.53, 82.24

[56] References Cited

U.S. PATENT DOCUMENTS

| 2,179,778 | 11/1939 | Dempster | 414/635 |
|---|---|---|---|
| 3,467,268 | 9/1969 | Corompt | 414/494 |
| 3,948,403 | 4/1976 | Johansson | 414/498 X |
| 3,957,166 | 5/1976 | Durham | 414/499 X |
| 4,139,228 | 2/1979 | Varadi | 294/81.53 X |
| 4,231,709 | 11/1980 | Corsetti | 294/81.53 X |
| 4,352,625 | 10/1982 | Bolderoff | 414/494 |
| 4,645,405 | 2/1987 | Cambiano | 414/494 |
| 4,704,063 | 11/1987 | Updike, Jr. et al. | 414/494 X |
| 4,715,768 | 12/1987 | Capps | 414/529 X |
| 4,828,308 | 5/1989 | Riedl | 294/81.53 |

FOREIGN PATENT DOCUMENTS

| 1680201 | 8/1970 | Fed. Rep. of Germany | 414/491 |
|---|---|---|---|
| 2302199 | 8/1973 | Fed. Rep. of Germany | 414/500 |
| 1296451 | 3/1987 | U.S.S.R. | 414/491 |
| 1271299 | 4/1972 | United Kingdom | 294/81.53 |

Primary Examiner—David A. Bucci
Assistant Examiner—Robert S. Katz
Attorney, Agent, or Firm—Lucas & Just

[57] ABSTRACT

There is described a load handling device for a vehicle which enables the vehicle to pick up and set down standard ISO containers. The device has a mast pivotally mounted at one end adjacent the rear of the vehicle for movement about a horizontal axis, and a cross-member mounted for movement along the length of the mast, the cross-member including elongate flexible tension elements extending from its ends and provided with load-engaging fixtures at their respective free ends, the device further including apparatus to vary the effective lengths of the flexible tension elements independently or in unison. This apparatus for varying the effective length of the flexible tension elements is advantageously mounted within the cross-member. In use, the load-engaging fixtures are attached to the corner fittings of a container while the mast is vertical and the cross-member is at the lower end of the mast. The tension elements are then pulled into the cross-member and the cross-member is moved along the mast as the mast is lowered, so that the container is lifted on to the vehicle. Offloading is achieved by reversing the procedure.

19 Claims, 5 Drawing Sheets

ISO CONTAINER HANDLING SYSTEM

The present invention relates to container handling apparatus, and is particularly concerned to provide a device mountable to a vehicle and capable of loading and off-loading standard I S O containers, either singly or joined to make up a standard length or a pallet of standard I S O dimensions, on to and from the vehicle.

It is known to provide load handling apparatus on vehicles in the form of a jointed arm pivoted to the vehicle chassis at its rear end, the arm carrying a hook engageable with a bar provided on a load pallet or container, the pallet or container being lifted and drawn on to the vehicle by the arm.

Such equipment cannot, however, load a standard I S O container since no hook-engaging bar is provided. To load such a container, the container must either be modified to provide a hook-engaging bar, or must be secured to a pallet which includes such a bar.

Accordingly it is an object of the invention to provide a load handling arrangement for a vehicle in which a standard I S O container or pallet may be loaded directly onto a vehicle and removed therefrom solely by a load-handling device mounted to the vehicle., The load handling device may be integrated with the vehicle chassis, or may be a separate unit mounted thereon.

According to the present invention, a load handling device for a vehicle comprises a mast pivotally mounted at one end adjacent the rear of the vehicle for movement about a horizontal axis, and a cross-member mounted for movement along the length of the mast, the cross-member including elongate flexible tension elements extending from its ends and provided with load-engaging means at their respective free ends, the device further including means to vary the effective lengths of the flexible tension elements independently or in unison. This means for varying the effective length of the flexible tension elements is advantageously mounted within the cross-member.

The cross-member is preferably provided at its ends with guide means such as sheaves or sprockets for the elongate flexible tension elements, which may be a wire, rope or chain. The effective length of the wires or chains, i.e. the length of wire or chain protruding from the cross-member ends may be controlled by winches mounted in the cross-member, but advantageously hydraulic rams are used. In one embodiment, each of the wires or chains is run over a movable pulley and is anchored at its end within the cross-member, so that reciprocating linear movement of the movable pulley will vary the effective length of the wire or chain. Alternatively, the wires or chains may be fixed directly to the piston rods of hydraulic cylinders so that retraction of the pistons draws in the wires or chains over the sheaves at the ends of the cross-member.

Preferably, the mast is formed in two relatively slidable sections, a first section being pivoted to the vehicle and the second section slidably mounted on the first and the cross-beam is mounted to the second position for movement along its length. Most preferably the cross-member is attached at a first point to an endless chain or rope running over pulleys or sprockets mounted at respective ends of the second section, the chain or rope being further attached, at a point diametrically opposed to the first point, to the first mast section adjacent its free end. Relative sliding movement of the two mast sections may be provided by means of one or more mydraulic rams, or by any other suitable means.

An example of a vehicle and a load-handling device according to the invention will now be described in detail, with reference to the accompanying drawings, in which.

Refering now to FIGS. 1 to 5, there is seen a vehicle 1 off-loading a standard I S O container 2. As will be appreciated, the container 2 is of standard I S O construction and dimensions, and has doors at one end face. The container has no load-handling equipment built in other than standard I S O corner fittings at its eight vertices. As an alternative to a container, the vehicle may handle flat pallets of I S O dimensions and provided with I S O corner fittings. The vehicle 1 is fitted at its rear end with a telescopic mast 3, pivotable between the substantially vertical position of FIG. 5 and the horizontal position of FIG. 1 by means of hydraulic rams 4.

Figure 8A:
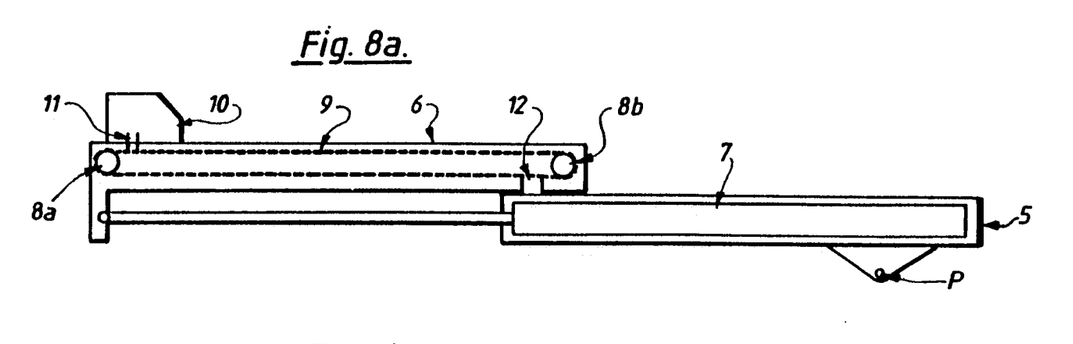
FIGS. 8a, 8b and 8c are schematic side views of the mast showing its extension and retraction.
Figure 8B:
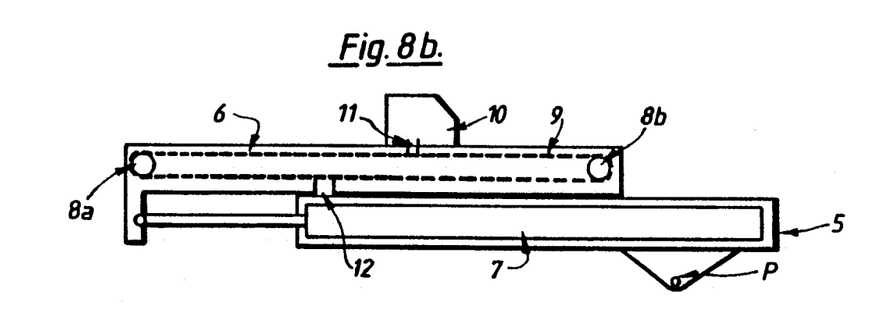
Figure 8C:
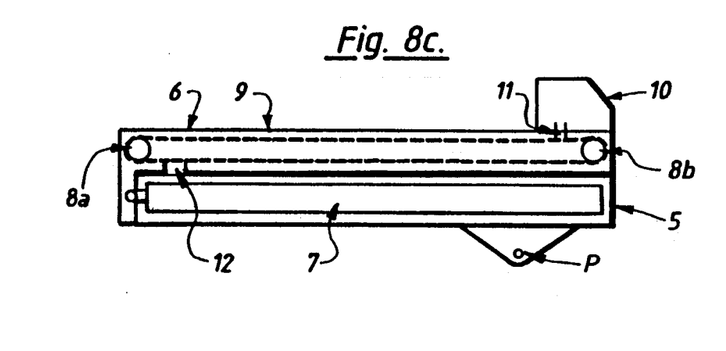

The telescopic mast 3, seen schematically in FIG. 8, has a first section 5 pivotally mounted to the chassis at P, and a second section 6 slidable in relation to the first section 5. A hydraulic ram 7 secured at its respective ends to the first and second mast sections 5 and 6 provides the effort to extend and retract the mast sections.

At the ends of second section 6 are mounted a pair of sprockets 8a, 8b about which an endless chain 9 extends. Clearly the chain 9 and sprockets 8 may be replaced by other elements such as wire rope and pulleys if the equipment loads allow.

A cross-member 10 is mounted on the second section 6 of the mast, for sliding movement therealong. The cross-member 10 is attached to the chain 9 at attachment 11, so that sliding movement of the cross-member is simultaneous with a movement of the chain 9 over the pulleys 8.

A point on the chain 9 diametrically opposed to attachment point 11 is fixeed at 12 to the first section 5 of the mast 3, adjacent its forward end. As is clear from the views shown in FIG. 8, the cross-member 10 is adjacent the rear end of the mast 3 when the mast sections 5 and 6 are retracted, and adjacent the free end of the second section 6 when the mast sections are extended by the ram 7.

In the embodiment shown in FIGS. 1 to 5, mast sections 5 and 6 are nested to present a flat surface to engage the underside of the container 2.

Figure 1:
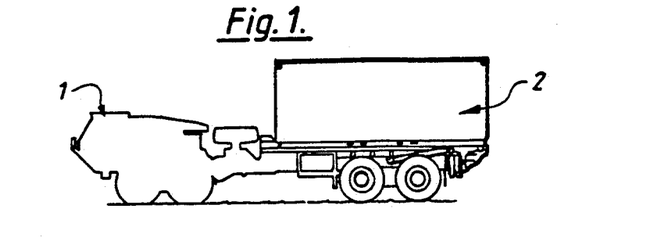
FIGS. 1 to 5 are a series of side elevations, showing the container being off-loaded from a vehicle.
Figure 2:
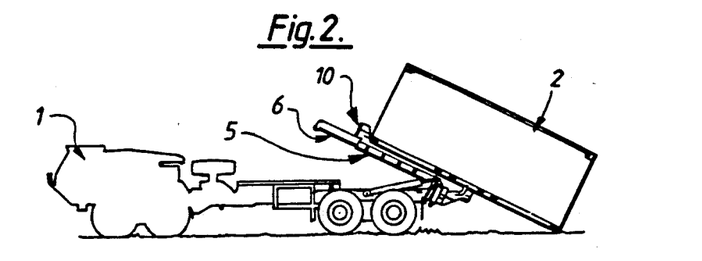
Figure 3:
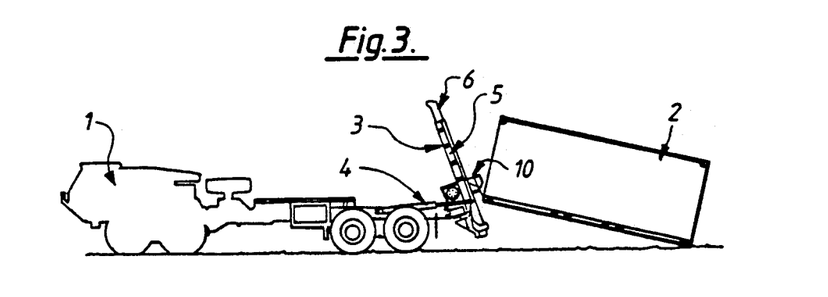
Figure 4:
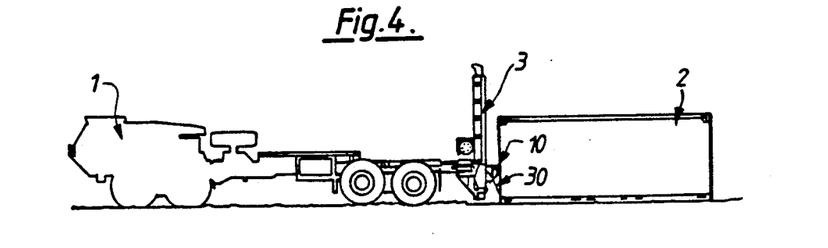
Figure 5:
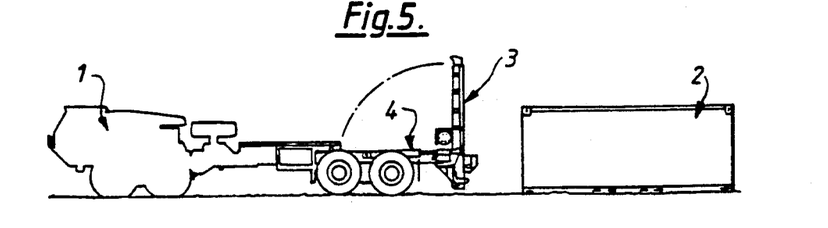
Figure 6:
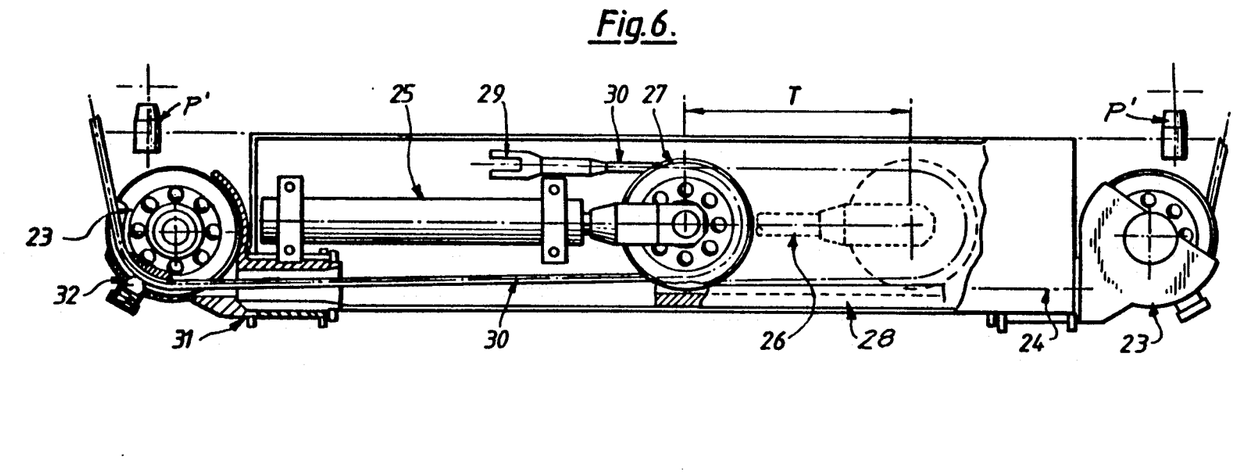
FIG. 6 is a view from above showing the cross-member in part-section.
Figure 7:
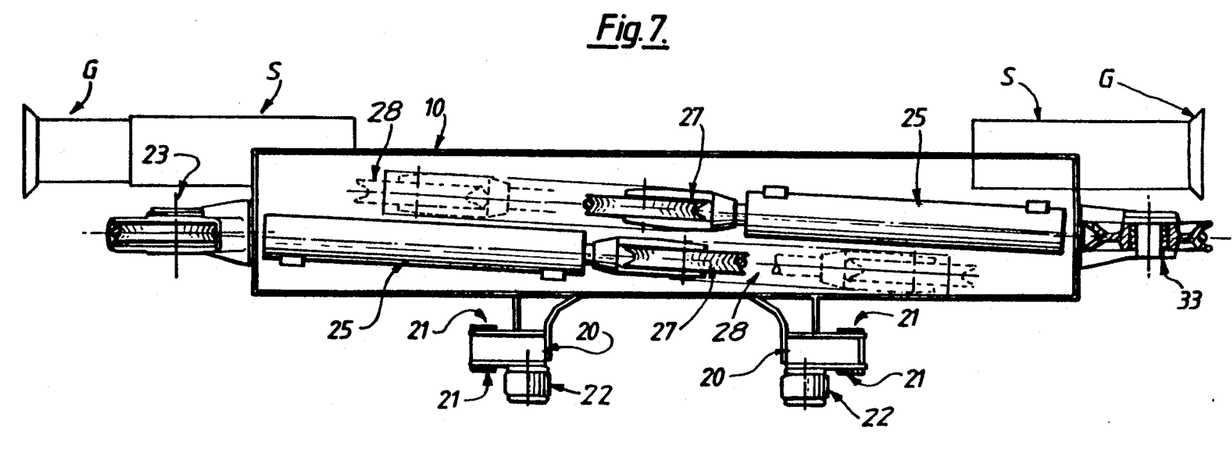
FIG. 7 is an elevation of the cross-member showing the disposition of the working parts.

Refering now to the cross-member 10, seen in FIGS. 6 and 7, guide shoes 20 are provided beneath the cross-member to engage in guide tracks in the second mast section 6. Bearing pads 21 on the guide shoes slide within the tracks transmitting any vertical loads (as seen in FIG. 7) and rollers 22 resist any lateral displacements of the cross-member relative to the mast.

At each end of the cross-member is mounted a sheave block 23, pivoted about a common castor axis 24 running along the length of the cross-member 10.

Within the cross-member 10 are mounted a pair of hydraulic cylinders 25, each of which carries at the free end of its piston rod 26 a sheave block 27. Two sheave guides 28 engage the sheaves 27 to allow linear movement of the sheaves 27 and pistion rods 26 but to prevent rotation of the sheave and piston rod assemblies about the piston rod axis. Over each sheave 27 a cable 30 passes from an anchor point 29 in the cross-member 10, round sheave 27, and thence to one of the sheaves 23. The cable 30 preferably passes through a hollow castor axle 31 of the sheave 23.

The ends of the cross-member 10 may be further provided with sleeves S containing laterally extendable guide rollers G, whose function will be described later.

Figure 9:
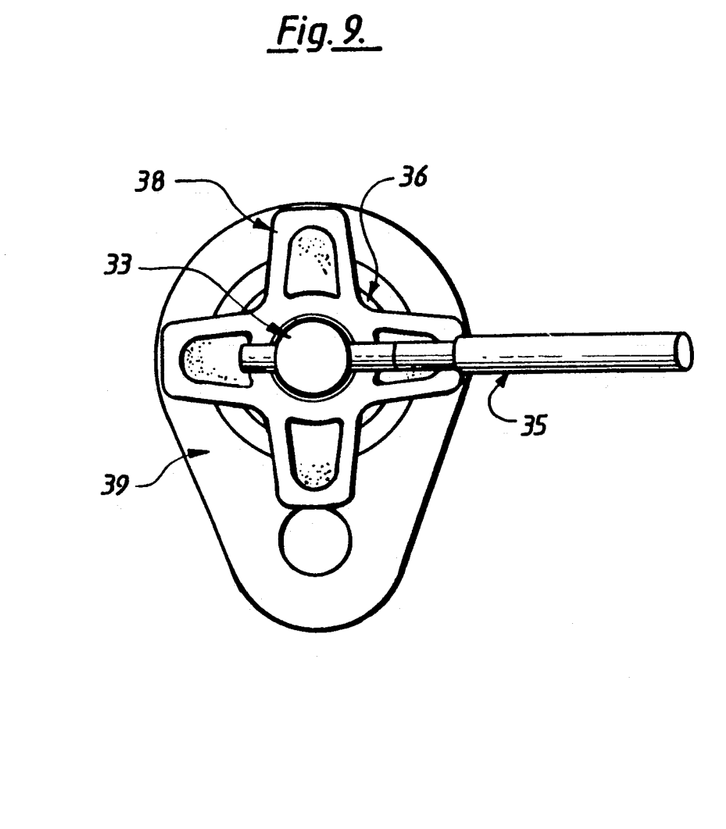
FIG. 9 is an end view of a fitting for connecting a chain or cable to an I S O corner fitting.
Figure 10:
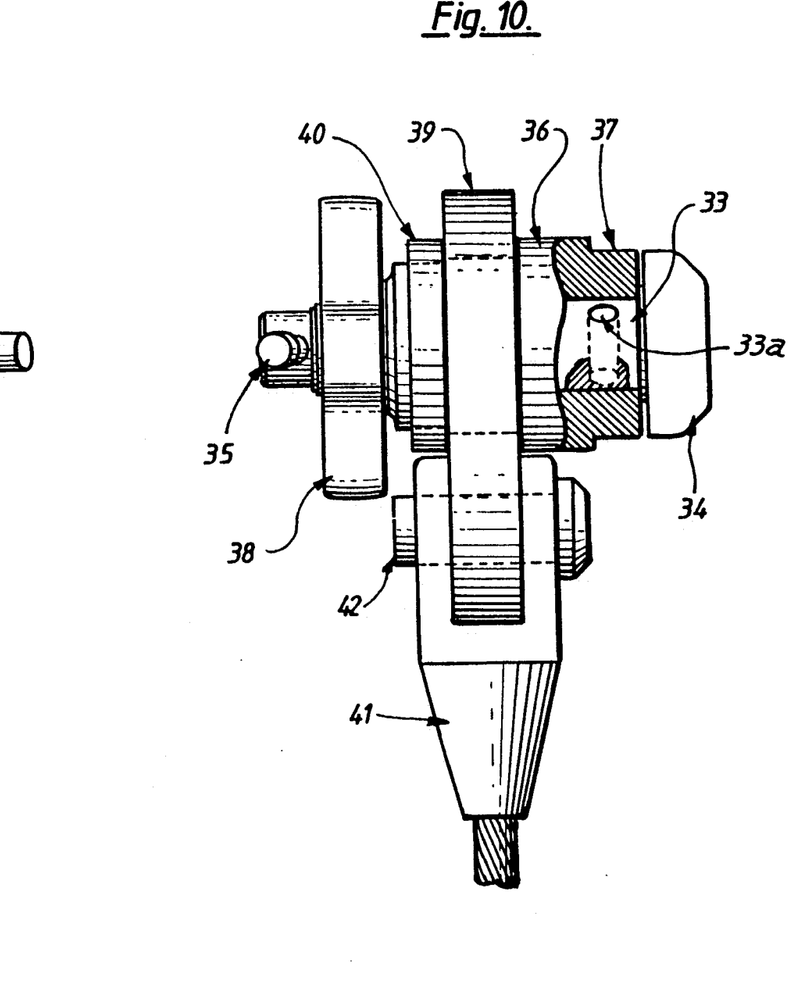
FIG. 10 is a part-sectional side view of the fitting of FIG. 9.

At the end of the cable 30 remote from the cross-member 10, a hook or other fitting capable of engaging a corner of an I S O container is provided. Such a fitting is shown in FIGS. 9 and 10, and comprises a central stem 33 formed at one end with an enlarged twistlock head 34 and at its other end with a transverse bar handle 35. The stem 33 passes through a sleeve 36 which is profiled at 37 to fit into an opening in an I S O corner fitting. Spring loaded balls 33a in a transverse bore in stem 33 cooperate with detents in the sleeve 36 to hold the stem in a predetermined angular position relative thereto. Mounted on the sleeve 36 for rotation thereabout is a plate 39, retained by a ring 40 welded in place on the sleeve 36. The plate 39 is attached to the cable end by a clevis 41 and pin 42. A cruciform locknut 38 is threadedly engaged on stem 33 adjacent the handle 35, and may be turned to engage the adjacent end face of the sleeve 36.

Referring again to FIG. 6, the cable 30 is pressed into the groove in sheave 23 by a spring-loaded roller or ball 32, and sheave 23 is itself provided with a torsion spring 33 which is pretensioned in the sense to feed the cable 30 out of the cross-member 10, thus maintaining the tension in that part of the cable between sheave 23 and anchorage 29. This ensures that, as rams 25 are extended, the cables 30 are drawn into the cross-member 10, and conversely, cable 30 are paid out over the sheaves 23 when rams 25 are retracted. The geometry is such that a ram having a travel T of 500 mm will provoke a movement of 1 meter at the free end of cable 30.

To enable the load handling system to operate on uneven terrian and in conditions where the containers may not "line up" exactly with the loading vehicle, foldable conical rollers may be provided on the mast or at the rear of the vehicle chassis to act as lateral guides during the on and off loading sequence by engaging the bottom side edge of the container.

Figure 12:
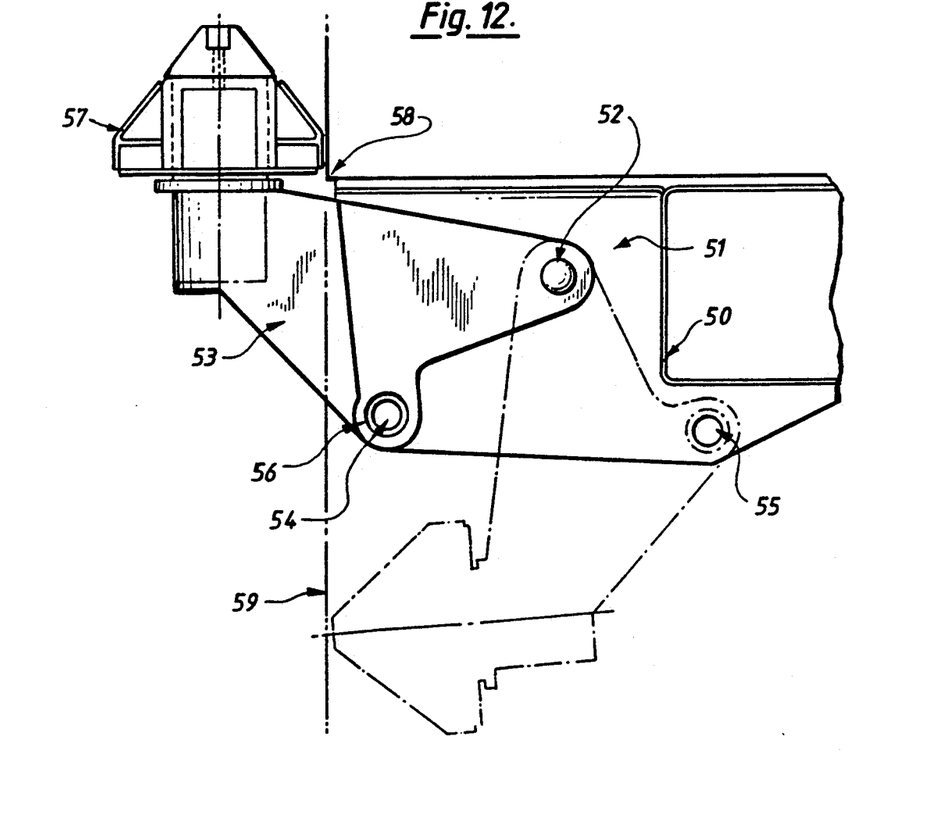
FIG. 12 is a detail elevation of an alignment roller assembly.

Such rollers are shown in FIG. 12, which shows a foldable roller assembly attached to the vehicle chassis 50 by means of a laterally extending web 51. The web 51 may alternatively be fixed to the rear end of the vehicle mast. A pivot pin 52 passes through web 51 to attach the roller support bracket 53 for pivotal movement between its operating position shown in solid lines and its stowage position shown in broken lines. The web 51 is provided with two further holes 54, 55, which are aligned with a bore 56 in the bracket 53 to receive a locking pin (not shown) when the bracket is in its operating and stowage positions, respectively.

In the operating position, the bracket 53 supports a conical roller 57 to rotate about a vertical axis, the lateral spacing between the rollers 57 and each side of the vehicle being such that a standard I S O container will just pass therebetween when properly aligned fore-and-aft on the vehicle. Any angular misalignment will cause one bottom side edge 58 of the container to ride up the conical roller's surface, and this will apply a corrective lateral force to the container. Rollers such as 57 may also be installed at intervals along the vehicle loadbed, and may be profiled to suit loads other than I S O containers.

It will be appreciated that in the stowed position, no part of the roller 57 or bracket 53 extends laterally beyond the plane 59 of the side of a container loaded on the vehicle.

Figure 11:
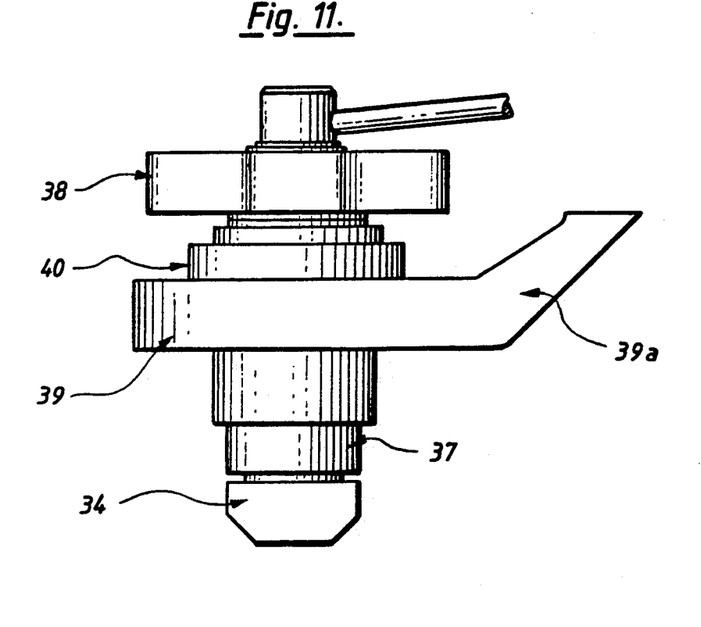
FIG. 11 is an elevation of a modified fitting for connecting a chain or cable to an I S O corner fitting.

An alternative or additional method of assisting alignment between the vehicle and the container is seen in FIG. 11, which is a view of a corner fitting seen in the direction of the cable when tensioned. The difference between this corner fitting and that of FIGS. 9 and 10 is that the plate 39 includes an angled extension 39 which extends radially away from the axis of the stem 33 at right angles to the direction of pull of the cable, andis inclined away from the twistlock head 34. When connected to the container fitting, a horizontally directed pull on the cable causes the extension 39a to project downwardly and outwardly from the lower edge of the container 2, where it can engage a guide rail on the vehicle 1 or on the mast 3.

Returning now to FIGS. 1 to 5, the operation of the device will be described.

To load a container or pallet, the vehicle 1 is brought to a position with its rear end adjacent one end (either end) of the container 2. The container may thus, in the loaded position, have it doors facing the front or rear of the vehicle. Mast 3 is raised to its vertical position, and mast sections 5 and 6. are retracted. Rams 25 within the cross-member are retracted to pay out cables 30 from the ends of the cross-member 10. The ends of cables 30 are then attached to the corner fitting of the container 2 adjacent the vehicle by means of the fittings shown in FIGS. 9 and 10. To achieve this, the twistlock head 34 is introduced into the aperture of the container corner fitting situated on the side face of the container, and the stem 33 and head 34 are rotated through 90° by means of handle 35. Locknut 38 is then tightened up to the end face of sleeve 36, drawing the head 34 towards the sleeve 36 and securing the fitting in place. It will be appreciated that the flexible nature of the cables 30 makes it unnecessary for the vehicle to be positioned with great precision relative to the container for connection to be made. This should be contrasted with existing hook/bar systems where the vehicle hook must be accurately engaged with the load before any lifting operation can proceed.

With the cables 30 engaged in the container corner fittings, the mast is simultaneously lowered by retracting rams 4, and extended by extending ram 7 (FIG. 8). At the same time rams 25 of the cross-member 10 are extended, shortening the free length of cables 30. This combination of movements lifts the end of the container and causes the vehicle to roll backwards until the upper surface of the mast 3 engages the underside of the container.

If the container is to be loaded on to the vehicle "doors first", i.e. if the cables are attached to the door end of the container, the guide rollers G will be extended from their respective sleeves S on the cross-member ends prior to lifting. The guide rollers G, during the lift, engage the vertical edges of the container outboard of the doors, and retain a spacing between the container and the cross-member which ensures that the door hinges and locking parts are not damaged by contact with the cross-member.

Continued extension of the mast draws the container along the mast 3 until the weight of the container is supported entirely by the vehicle. The mast is then lowered to a horizontal position, and finally either a further extending movement of the mast or a final retraction of the cables 30 draws the container 2 forward to its transport position on the vehicle 1.

Advantageously, the vehicle chassis or the cross member 10 carries two rearwardly facing pins p1 which enter openings on the front faces of the container corner fittings to secure the forward end of the container in its final position. Additionally conventional twistlocks or other securing clamps may be provided on the vehicle at appropriate locations to retain either a single container or a number of shorter containers joined together.

To reduce the width of the loaded vehicle, the cable end fittings are removed from the container corners by loosening locknuts 38 and rotating stem 33 via handle 35. The cables 30 may then be paid out to allow the fittings at their free ends to be stowed at points forward of the container, within its overall width.

In order to reduce friction and to spread the supported area of the container the mast 3 and vehicle chassis may be provided with supports in the form of endless conveyors. Such conveyors will engage the underside of the container and move with it as it is drawn along first the mast 3 and then the mast and vehicle body. The conveyors are preferably constructed as an endless chain of links having an outwardly facing bearing surface, the bearing surfaces of a straight run of chain being coplanar. Locking means may also be provided to immobilise the conveyor chains during transit.

In an advantageous development of the vehicle, the mast 3 may be mounted not directly to the vehicle chassis but to a sub-frame pivotally mounted to the vehicle chassis about a transverse horizontal axis. Such an arrangement allows either the mast alone to be pivoted in relation to the chassis, or the mast and sub-frame to pivot as a single unit relative to the body, thus enabling the operator to select the axis about which the mast will pivot. The sub-frame is locked in position relative to the vehicle chassis or to the mast by means of two sets of cooperating lugs provided on the sub-frame and mast and on the sub-frame and chassis, the lugs having aligned bores through which locking pins may be passed to prevent relative movement of the mast and sub-frame or the chassis and sub-frame. The locking pins are perferably operated by means of hydraulic cylinders interconnected in such a way that as one of the locking pins is inserted into its set of lugs, the other locking pin is withdrawn from its lugs.

Such an arrangement, in the vehicle seen in FIGS. 1 to 5, will allow the operator to raise the mast and sub-frame to a position in which the mast is vertical and has its lower end substantially at ground level as shown, or to lock the sub-frame to the vehicle chassis and raise the mast alone, in which case the mast will extend upwardly with its lower end above the ground at the height of the vehicle chassis. In this second-described position, the mast may be raised beyond the vertical and by equipping the cross-member with a central sheave and the mast with a winch, the vehicle may be used as a crane to lift loads, or to deploy and retrieve equipment.

To further increase the versatility of the vehicle, a set of floor panels may be provided which can be placed on the vehicles's loadbed when the mast is in its horizontal extended position. It is envisaged that the design of the floor panels and the hydraulic control circuitry for the mast will be such that installation of the floor panels will automatically prevent operation of the mast hydraulics, for example by detecting the installation of the floor by a microswitch and using its output to interrupt the supply of hydraulic fluid to the mast lifting and extending rams.

What is claimed is:

1. A load handling device for a vehicle comprising a mast, one end of which is pivotally mounted adjacent the rear of the vehicle for movement about a first horizontal axis, a horizontal cross-member mounted for movement along the length of the mast, elongate flexible tension elements each having a part extending from each end of the cross-emember and provided with load-engaging means at its respective free end, and the device further including means mounted within the cross-member for varying the length of that part of each flexible tension element extending from the respective end of the cross-member.

2. A device according to claim 1, wherein each flexible tension element has one of its ends fixed within the cross-member and thence passed over a movable pulley and out of the end of the cross-member, the arrangement being such that movement of the movable pulley alters the length of that part of the flexible tension element contained within the cross-member.

3. A device according to claim 2, wherein the movable pulley is mounted to a hydraulic ram and is reciprocable in a linear guide.

4. A device according to claim 1, wherein each flexible tension element is attached directly to the piston rod of a hydraulic ram, so that extension and retraction of the ram varies the length of that part of the flexible tension element within the cross-member.

5. A device according to claim 1, wherein each flexible tension element is guided by a respective castor-mounted guide mounted at an end of the cross-member.

6. A device according to claim 5, wherein each castor-mounted guide means includes means to grip the respective flexible tension element and means to urge that flexible tension element out of the cross-member.

7. A device according to claim 5, wherein each flexible tension element is a wire rope, and each castor-mounted guide is a sheave.

8. A device according to claim 1, wherein the load-engaging means is adapted to cooperate with an I S O corner fitting.

9. A device according to claim 8, wherein the load-engaging means comprises a sleeve having one end portion adapted to be received in a non-circular opening of an I S O corner fitting, a stem passing through the sleeve and rotatable therein to position an enlarged head on one end of the stem either in or out of alignment with the said end portion of the stem, locking means operative between the stem and the sleeve, and an attachment plate rotatably mounted on the stem and adapted to be secured to a flexible tension element.

10. A device according to claim 9, wherein the attachment plate includes a radial extension projecting obliquely away from the said end of the stem and displaced circumferentially approximately 90° from the flexible tension element.

11. A device according to claim 1, wherein the vehicle includes a loadbed on which the I S O container will rest in the loaded position, a pair of rollers being mounted to the vehicle to extend upwardly from the loadbed and to be rotatable about vertical axes, the spacing between the rollers corresponding to the transverse external dimension of an I S O container.

12. A device according to claim 11, wherein the rollers are supported on mobile mountings for movement between a first, deployed, position in which the rollers extend upwardly above the vehicle loadbed and are spaced by a distance equal to the width of an I S O container, and a second, retracted, position in which the rollers are positioned beneath the vehicle loadbed so that no part of the mounting or roller extends laterally beyond half an I S O container width from the vehicle centreline.

13. A device according to claim 12, wherein each of the mountings is swingable about an axis parallel to the vehicle centreline, and is lockable in its deployed and retracted positions by a pin extending through aligned bores in the mounting and the vehicle chassis.

14. A device according to claim 11 wherein each roller comprises a cylindrical lower portion and an upwardly tapering upper portion.

15. A device according to claim 1, wherein the cross-member includes at least one locating pin engageable in an opening of the container when the mast is in a horizontal position with the cross-member at the free end of the mast and the flexible tension elements retracted to draw a container along the mast toward the cross-member.

16. A device according to claim 15, wherein two locating pins are positioned on the cross-member to engage openings in the forward facing surfaces of the corner fittings of the container to which the load-engaging means are secured.

17. A device according to claim 1, wherein guide rollers are provided on the cross-member to engage the forward face of the container during handling, to prevent damage to door fittings on the container face.

18. A device as claimed in claim 17, wherein the cross-member carries at each of its ends one of a pair of coaxial flanged rollers, the flanges being at the outboard ends of the rollers, and each roller being axially movable between an extended and a retracted position, the roller extending beyond the ends of the cross-member in the extended position only and being capable, when extended, of engaging the edge regions of the forward face of a container being handled while the respective flanges engage the respective side faces of the container.

19. A device as claimed in claim 1, wherein the cross-member carries at each of its ends one of a pair of coaxial flanged rollers, the flanges being at the outboard ends of the rollers, and each roller being axially movable between an extended and a retracted position, the roller extending beyond the ends of the cross-member in the extended position only and being capable, when extended, of engaging the edge regions of the forward face of a container being handled while the respective flanges engage the respective side faces of the container when the mast is in an upright or substantially vertical position.

* * * * *

UNITED STATES PATENT AND TRADEMARK OFFICE
CERTIFICATE OF CORRECTION

PATENT NO. : 5,007,791
DATED : April 16, 1991
INVENTOR(S) : T. Trafford Boughton It is certified that error appears in the above-identified patent and that said Letters Patent is hereby corrected as shown below:

Column 1, line 25, after "vehicle." delete ",".

Column 1, line 61, delete "position" and substitute therefor --section--.

Column 2, line 2, change "mydraulic" to --hydraulic--.

Column 2, line 23, change "Refering" to --Referring--.

Column 2, line 54, change "fixeed" to --fixed--.

Column 2, line 64, change "Refering" to --Referring--.

Column 3, line 10, change "pistion" to --piston--.

Column 3, line 46, change "cable" to --cables--.

Column 3, line 51, change "terrian" to --terrain--.

Column 4, line 24, change "andis" to --and is--.

Column 4, line 36, change "it" to --its--.

Column 5, line 56, change "perferably" to --preferably--.

Column 6, line 6, change "vehicles's" to --vehicle's--.

Column 6, line 22, change "cross-emember" to --cross-member--.

Column 6, line 30, change "passed" to --passes--.

UNITED STATES PATENT AND TRADEMARK OFFICE
CERTIFICATE OF CORRECTION

PATENT NO. : 5,007,791
DATED : April 16, 1991
INVENTOR(S) : T. Trafford Boughton It is certified that error appears in the above-identified patent and that said Letters Patent is hereby corrected as shown below:

Column 6, line 31, before "end" delete "the" and substitute therefor --a respective--.

Signed and Sealed this

Eighteenth Day of August, 1992

Attest:

DOUGLAS B. COMER

Attesting Officer

Acting Commissioner of Patents and Trademarks